No. 666,072. Patented Jan. 15, 1901.
G. M. SHERMAN.
FERTILIZING APPARATUS.
(Application filed Apr. 21, 1900.)

(No Model.)

Witnesses: Inventor:
Gardner M. Sherman,
by his Attorney.

UNITED STATES PATENT OFFICE.

GARDNER M. SHERMAN, OF SPRINGFIELD, MASSACHUSETTS.

FERTILIZING APPARATUS.

SPECIFICATION forming part of Letters Patent No. 666,072, dated January 15, 1901.

Application filed April 21, 1900. Serial No. 13,725. (No model.)

*To all whom it may concern:*

Be it known that I, GARDNER M. SHERMAN, a citizen of the United States of America, and a resident of Springfield, in the county of Hampden and State of Massachusetts, have invented certain new and useful Improvements in Fertilizing Apparatus, of which the following is a full, clear, and exact description.

This invention relates to improvements in means for the introduction of fertilizing liquid composition to the roots of a shrub or other plant, whereby the composition becomes available to and nourishes and forces the growth of the plant in the maximum degree.

My invention consists in a cast or body of absorbent material which is substantially solid through its entire bulk and provided with a passage leading down through its top, combined with an upwardly-extending pipe leading from above said body and through which pipe the fertilizing mixture is introduced.

The improved device or apparatus is illustrated in the accompanying drawings, in which—

Figure 1:
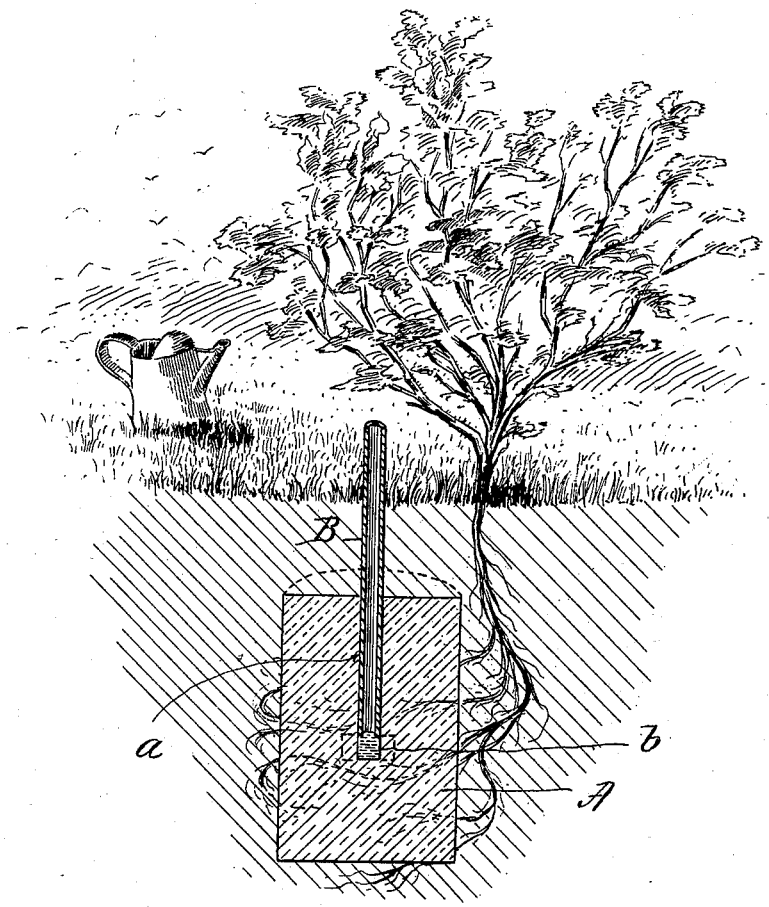
Figure 2:
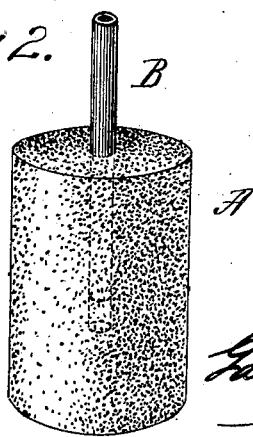

Figure 1 is a perspective and vertical sectional view showing the same and the manner of its utilization in the soil adjacent the roots of a shrub or bush. Fig. 2 is a perspective view of the device.

In the drawings, A represents the cast or porous body, which is shown as of cylindrical form, which is an appropriate though not an essential one, and which may advantageously be made by molding of two-thirds plaster-of-paris and one-third Portland cement.

B represents the pipe or tube for supplying the liquid fertilizer to the interior of the cast, the same being molded with its lower end portion penetrating well down into the body of the cast, or the cast may be molded with the central socket $a$, down into which the lower half or otherwise suitable portion of the tube may be entered with a close fit. As shown in Fig. 1, the socket has a greater depth than the length of the portion of the pipe which penetrates the cast, leaving a basin or cavity $b$ below the end of the pipe, and, if desired, this cavity may be diametrically enlarged, whereby the liquid may be with somewhat greater freedom and quickness introduced into the cast.

The devices will be constructed in different sizes and proportions to accord with the character of the plants in conjunction with which they are to be employed.

Fig. 1 renders manifest the mode of utilization of the apparatus, it being seen that the cast is buried in the soil next to the roots of the bush, which may be done at the time of planting or transplanting the bush or after the same may have been set. A solution comprising the chemical ingredients which may be known as best fulfilling the requisites for growth of the given bush are poured down into the upwardly-open pipe B in quantity sufficient to permeate or saturate the cast, to which the roots will turn and adhere, deriving sustenance.

The devices are of great utility and value not only in accelerating the growth of plants by giving to them with the utmost directness the most suitable fertilizing ingredients which they are known to require, but in experimenting in series modifying or varying the constituents supplied through the medium of the various casts with a view to the observation and comparison of the results. These casts may be supplied as a new article of manufacture and sale with the chemical solution of suitable character incorporated in and throughout the bodies thereof, so that the buyer and user has merely to follow directions in placing the device in the ground suitably in relation to the roots of the plant to be fertilized and to occasionally supply a fertilizer solution in the upwardly-extending stem for renewing the activity of the device as occasion may require.

Having thus described my invention, what I claim, and desire to secure by Letters Patent, is—

1. As a new article of manufacture the device for fertilizing plants herein described the same consisting essentially of a cast or body of absorbent material (such as compound of plaster-of-paris and cement) which is substantially solid or homogeneous throughout its entire bulk with, however a passage, the diameter of which is but fractional of that of the said absorbent body leading to the interior of such body, and an upwardly-open pipe leading from above the said body to connection with the said passage, substantially as described.

2. A fertilizing apparatus consisting of a cast or body of absorbent material, adapted for the absorption and incorporation therein of a liquid fertilizer solution, and constructed with a passage leading from its top down to the middle part thereof, the diameter of the body being several times greater than that of the said passage, and a tube, the lower portion of which is fitted into the said passage, while the upper end thereof projects a suitable distance above the said absorbent body, substantially as described.

3. As a new article of manufacture the device for fertilizing plants herein described, the same consisting of a cast or body of absorbent material substantially solid or homogeneous throughout its entire bulk, with however a small passage leading to the interior of the body, and a tube leading from above the body to connection with the said passage, as described.

Signed by me at Springfield, Massachusetts, in presence of two subscribing witnesses.

GARDNER M. SHERMAN.

Witnesses:
WM. S. BELLOWS,
A. W. SMITH.